US006374356B1

(12) United States Patent
Daigneault et al.

(10) Patent No.: US 6,374,356 B1
(45) **Date of Patent: *Apr. 16, 2002**

(54) SHARED INTELLIGENCE AUTOMATED ACCESS CONTROL SYSTEM

(75) Inventors: Benoit Daigneault, Ville Lorraine; Pierre Lemieux, Laval, both of (CA)

(73) Assignee: AXS Technologies, Inc., Laval (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,637

(22) Filed: Jun. 23, 1998

(30) Foreign Application Priority Data

Jun. 17, 1998 (CA) ............................................ 2240881

(51) Int. Cl.[7] ................................................ G06F 11/30

(52) U.S. Cl. .................. 713/200; 340/825.31; 235/382

(58) Field of Search ................................ 713/200, 202; 340/825.31; 235/380, 382, 382.5, 377; 711/162, 163; 709/229

(56) References Cited

U.S. PATENT DOCUMENTS

| | | | | |
|---|---|---|---|---|
| 3,926,021 A | | 12/1975 | Genest et al. | 70/278 |
| 4,223,403 A | | 9/1980 | Konheim et al. | 375/2 |
| 4,415,893 A | | 11/1983 | Roland et al. | 340/825 |
| 4,727,369 A | | 2/1988 | Rode et al. | 340/825.31 |
| 4,816,658 A | | 3/1989 | Khandwala et al. | 235/382 |
| 4,849,614 A | | 7/1989 | Watanabe et al. | 235/379 |
| 4,988,987 A | * | 1/1991 | Barrett et al. | 340/825.31 |
| 5,140,317 A | * | 8/1992 | Hyatt, Jr. et al. | 340/825.31 |
| 5,319,362 A | * | 6/1994 | Hyatt, Jr. | 340/825.31 |
| 5,475,378 A | | 12/1995 | Kaarsoo et al. | 340/825.34 |
| 5,477,041 A | * | 12/1995 | Miron et al. | 235/382 |
| 5,541,583 A | | 7/1996 | Mandelbaum | 340/825.54 |
| RE35,336 E | | 9/1996 | Ulch et al. | 340/825.31 |
| 5,610,981 A | | 3/1997 | Mooney et al. | 380/25 |
| 5,623,258 A | | 4/1997 | Dorfman | 340/825.08 |
| RE36,426 E | * | 12/1999 | Wiik et al. | 235/382 |

* cited by examiner

*Primary Examiner*—Scott Baderman
(74) *Attorney, Agent, or Firm*—Fish & Richardson P.C.

(57) ABSTRACT

The present invention relates to access control systems ore commonly referred to as security systems. In a preferred embodiment of the invention, the access control system uses a memory card and a network of access control subsystems. Among the specific characteristics of the invention are the loading of schedule data on the memory card and the devolution of specific functions such as schedule validation to the access control subsystem level. These characteristics of the system provide, among other advantages, a reduction of the amount of wiring, a reduction in the hardware and installation costs, a considerable memory saving for the hardware and an increase in the system's capacity and flexibility.

19 Claims, 6 Drawing Sheets

Prior Art

Prior Art

SHARED INTELLIGENCE AUTOMATED ACCESS CONTROL SYSTEM

FIELD OF THE INVENTION

The present invention relates to systems and methods for authorizing the execution of desired actions through validation of schedule data that provides a timetable during which the execution of one or more of such actions are authorized. In a specific example, the invention may be put in practical use in access control systems designed to control user access to a door, for example. The access control system determines on the basis of schedule data stored on a user card if the access to the premises may be granted to this particular user for that particular time of day.

BACKGROUND OF THE INVENTION

The basic architecture for well-known security systems uses a Central Access Control System Computer (CACSC) remotely managing one or more Standard Access Controller (SAC) that control a certain number of service areas. Each SAC, acting as a bridge between the CACSC and a number of local control devices, directly manages most of the functions of the local control device. Each local control device can be viewed as a collection of devices that provide the required services to a controlled access point (such as a door). Examples of those devices are a lock device, a lock status sensor, a door contact sensor, a request-to-exit device, a card reader device, a warning device, a manual pull-station, an intercom, and a video camera, among others.

Typically, the SAC is installed at a central location in the premises and the individual local control devices are connected to the SAC with wires. Each of the devices of a given local control device requires individual wiring over an appreciable length between the SAC and the local control device. In a typical example, a total of 22 wires and one coax cable may be required between each local control device and the SAC.

In use, when a user desires to access the premises, he or she inserts a portable memory device (i.e., an identification card) in the card reader of the local control device. The card reader extracts from the card the user identification number. This identification number is usually a 26 to a 32-bit data unit. This number is then transmitted to the remote SAC that contains a database of all the authorized user identification numbers. The SAC compares the received identification number with the valid numbers held in the database. In the event a match is found, the SAC invokes a scheduler that determines if the user can access the premises at that particular time. The scheduler is also a database mapping the valid identification numbers with schedule information. If the scheduler reports that the user is allowed to access the premises at that given time, the SAC issues a control signal to the electric lock of the local control device to unlock the door.

This implementation requires the SAC to store all the identification numbers, user information, schedules, door access information, etc. in its processor's memory.

A first drawback with present systems is related to the memory capacity of the SAC. Actual systems, for say 5000 users, are limited to 100–150 schedules. This means that the typical memory allocation does not even provide one unique schedule per user. Furthermore, with the advent of new services such as photo identification even more memory capacity will be required. One solution might be to increase the SAC's memory, however, this is expensive.

A second drawback is associated with the number of wires and their length between the SAC and the local control device. This requires the routing of a wire bundle from each Local control device to the SAC that is installed in a utility cabinet at a distance up to 500 feet away. This becomes a problem when troubleshooting of the system is necessary. When troubleshooting is performed, it may be necessary to inspect and/or test each of the individual wires. Furthermore, every time a new service is installed at a controlled access point (local control device), routing of additional wires from the CAP to the SAC is necessary. Troubleshooting and new service installation can therefore be quite time consuming.

Thus, there exists a need in the industry to provide an improved automated access control system that alleviates the drawbacks associated with prior art systems.

OBJECTIVES AND SUMMARY OF THE INVENTION

An object of this invention is to provide an improved system and method for authorizing the execution of desired actions through validation of schedule data.

Yet another object of the present invention is to provide an improved portable memory device, such as a hand held electronic card, that is capable of storing schedule data that can be processed at a local control device to determine if a desired action can be effected at least in part on the basis of the scheduled data.

As embodied and broadly described herein, the invention provides a portable memory device to enable execution of a desired action by a control device, said portable memory device including a machine readable storage medium holding a data structure including schedule data providing at least one time interval during which the execution of the desired action may potentially be authorized by the control device, said data structure being readable by the control device to acquire said schedule data and determine if the execution of the desired action is to be authorized on a basis at least in part of said schedule data.

For the purpose of this specification, the expression "schedule data" is intended to encompass any collection of data that constitutes or provides the functionality of a timetable. In a specific example, the schedule data may provide one or more time intervals during which a user may be authorized to access the premises of a building, or generally enable the execution of the certain function, such as unlocking the door.

In a most preferred embodiment of the present invention, the portable memory device is in the form of an access card including a machine-readable storage medium in which is stored the data structure providing the necessary data elements to complete a user validation transaction at a door of a premises. More specifically, three specific data elements are stored on the machine-readable storage medium, namely a user identification number, schedule data and schedule validation data. The user identification number is employed to validate the user against a known list of identification codes that are established as valid codes. In other words, if the identification code read from the card does not match any one of the codes in the list, access is denied. The schedule data element is used to determine the time frame of each day or of selected days during which access to the premises can be granted to the user. Finally, the schedule validation data is provided to authenticate the schedule data on the memory device through an interaction involving the control device.

In this example, the control device is capable of a much broader decision making process, since most of the information that is necessary to the control device to determine if access to the user is to be granted is locally available. Part of this information is held in the memory of the control device and part is acquired from the portable memory device. This feature limits the data exchange with the SAC during a transaction with a user. Accordingly, the number of wires that interconnect the control device with the SAC can be significantly reduced since the limited data exchange can be implemented by using a serial data transmission protocol.

In a specific example of the operation of the system, a user presents his access card to the card reader at the local control device. The card reader scans the card and extracts the information from the card and stores it to a temporary memory location in the local control device. The local control device will process the information (user identification number, schedule data and schedule validation data for this user) to determine if the action sought by the user can be authorized.

The decision making process is based on an analysis of the three data elements stored on the user card. First, the control device will search the list of valid user identification codes stored in his memory and if a match is found it will then proceed to the next step that is to process the schedule data to determine if at that particular time access may be granted. The decision is based on an analysis of the schedule validation data also acquired from the card.

In a very specific example, the schedule data includes a global set of schedule data elements, each schedule data element providing a certain time frame during which access to the premises may be potentially authorized for the specific user. However, there is no indication on the card as to which of the schedule data elements are valid. The purpose of the validation schedule data is to indicate, by interfacing with additional data residing on the local control device, which ones of the global schedule data elements are valid for this user. The validation schedule data element can be a simple pointer that constitutes an index for a table residing in the local control device, the table entry for that index identifying one or more schedule data elements amongst the global set of schedule data elements in the global set that are valid for this particular user.

In summary, to gain access to the premises the user access card designed in accordance with the preferred embodiment of the invention must provide three separate types of information, namely a user identification number, a global set of schedule data elements and a pointer to a table in the memory of the local control device. There are a number of advantages that result from this arrangement. First, the decision making process regarding user validation is effected locally, without any substantive data exchange with the SAC. This translates into a much faster response time. Secondly, the number of wires necessary to support the data exchanges between the local control device and the SAC is significantly reduced because much less bandwidth is now necessary in the data exchanges local control device/SAC. Those data exchanges are now mostly limited to downloading toward the local control device the information necessary for the local control device to make the necessary decisions during the transactions with the user. For example, the SAC will upload toward the local control device the lists of authorized user identification numbers, the tables identifying the valid schedule data elements for each user, etc.

The validation schedule data is not necessarily a separate data element and can be combined with another data element on the portable memory device. For instance, in a specific example, the user identification number can be used as the pointer to the table in the memory of the control device in order to determine which ones of the schedule data elements in the global set of schedule data elements are valid. This feature is beneficial because it combines into a single data element a dual functionality, thus economizing memory space on the portable memory device. Thus, for the purposes of the present specification, the expression "validation schedule data" does not necessarily imply the existence of a separate data element in the portable memory device. A "validation schedule data" is deemed to exist when a data element is present in the portable memory device that provides the functionality of the validation schedule data, even when that data element is used for other purposes as well.

As embodied and broadly described herein, the invention provides a portable memory device for enabling the execution of a desired action by a control device, said portable memory device including a machine readable storage medium holding a data structure including:

a) a global set of schedule data elements, each data element of said set being indicative of a time interval during which the execution of the desired action may potentially be authorized by the control device;

b) schedule validation data; and c) said data structure being readable by the control device to acquire said schedule data and said schedule validation data, said schedule validation data being indicative through reference to a data arrangement external to said portable memory device of at least one of said schedule data elements that is representative of a time interval during which the control device authorizes execution of the desired action.

As embodied and broadly described herein, the invention further provides a control device for controlling the execution of a certain function, said control device including:

a) an input for receiving:
   i) a global set of schedule data elements, each schedule data element of said set being indicative of a time interval during which the execution of the desired action may potentially be authorized by the control device; and
   ii) schedule validation data; and b) processing means responsive to said schedule validation data to identify in said set of schedule data elements a sub-set of schedule data elements that includes at least one schedule data element that is representative of a time interval during which the control device authorizes execution of the desired action.

DESCRIPTION OF A PREFERRED EMBODIMENT

Figure 1:
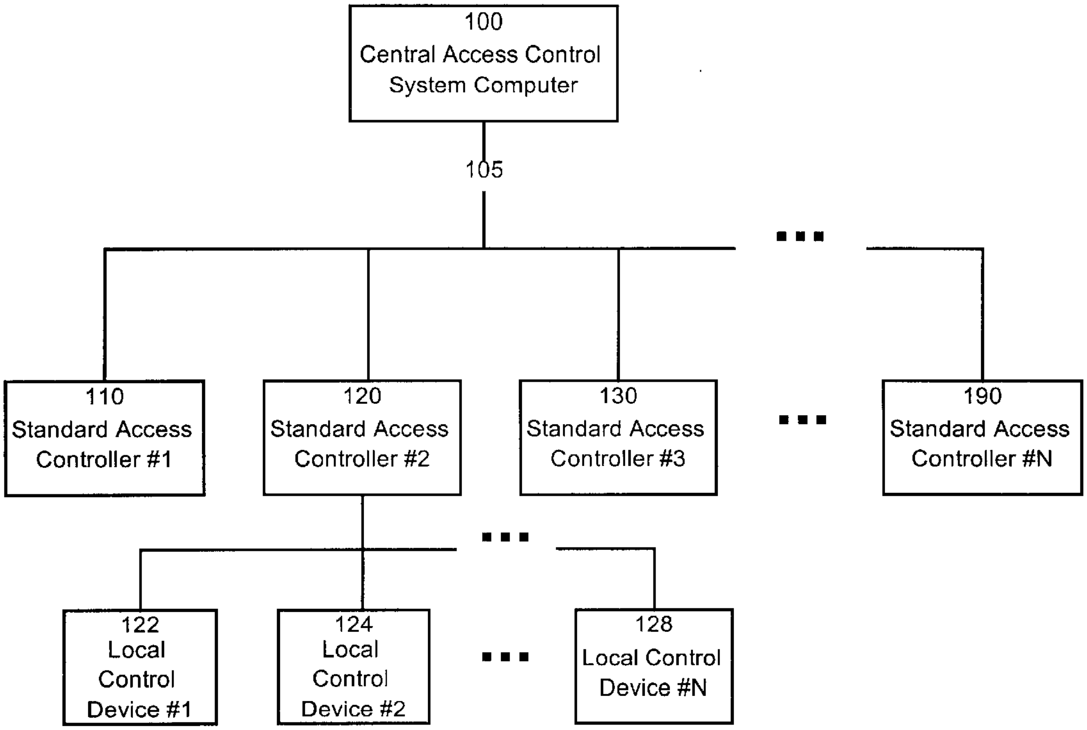
FIG. 1 is a block diagram of an access control system constructed in accordance with the prior art.

The basic architecture of prior art access control systems is as illustrated in FIG. 1. The system includes a central processor, designated more specifically as a Central Access Control System Computer (CACSC) 100 that manages a certain number of Standard Access Controllers 110, 120, 130 and 190 (up to N in this illustration). Each SAC, acting as a bridge between the CACSC and a number of local control devices (such as 122, 124 and 128), directly manages most of the functions of the local control devices (i.e., 122, 124 and 128 for SAC 120). Local control devices 122, 124 and 128 usually service controlled access points to a facility. In a specific example, the controlled access point may be a door providing access to certain premises. The services that local control devices 122, 124 and 128 provide to the controlled access point include door opening, door locking, intercom, video, etc. Each local control device 122, 124 or 128 can be viewed as a collection of devices under the control of, say, SAC 120 that is responsible for the decision making process. Thus, prior art access control systems are essentially three layer structures, there being a main CACSC 100 that oversees the operation of the entire network, one or more SACs 110, 120, 130 and 190 that control the individual local control devices (such as 122, 124 and 128), the local control devices forming the final layer of the network.

Data communication is effected between the CACSC 100 and each SAC 110, 120, 130 and 190 through data communication pathways interconnecting the various components of the access control system in a network arrangement 105. An example of a data communication protocol on network 105 is RS-485 (RS=Recommended Standards). RS-485 is an Electronics Industry Association standard for serial communications over wires. It allows multiple devices to share a single line. RS-485 can support up to 32 drivers and 32 receivers over a single twisted pair cable up to a maximum cable length of 4000 feet.

Figure 2:
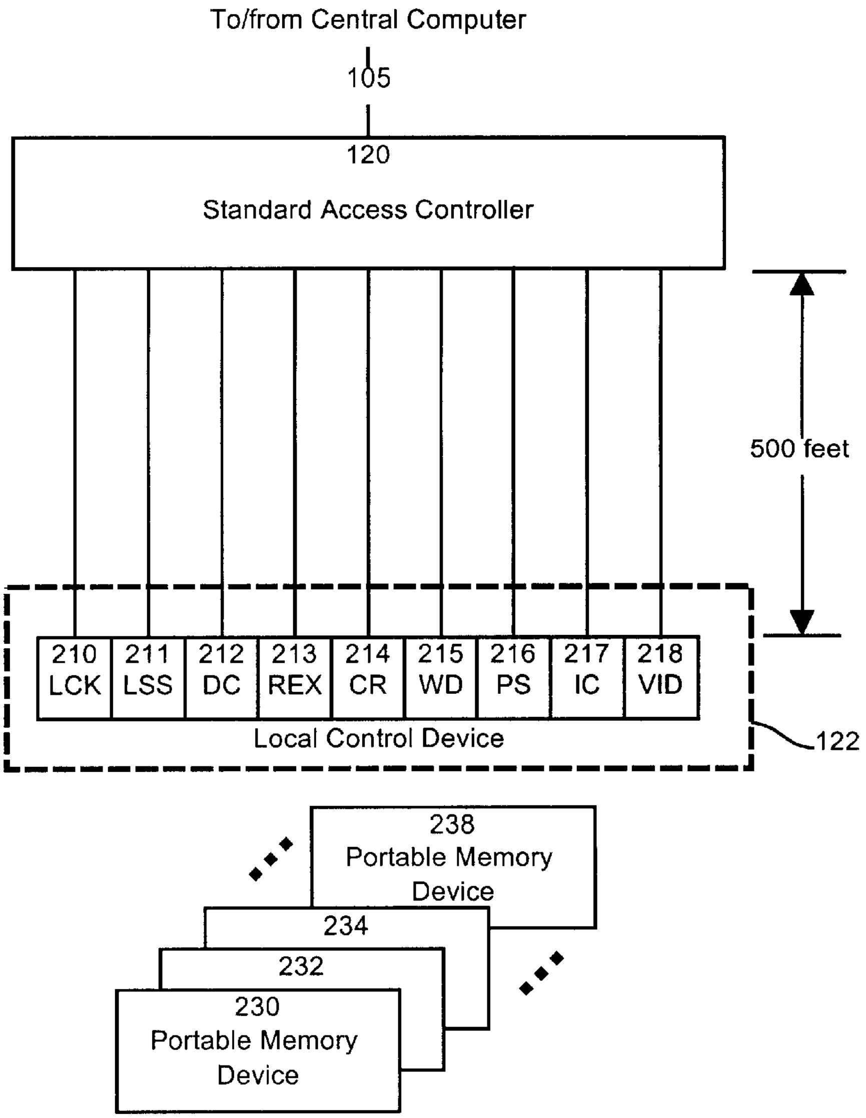
FIG. 2 is a detailed block diagram of a local control device and of an associated standard access controller (SAC) of the access control system depicted in FIG. 1.

An example of a SAC 120 and an associated local control device 122, according to the prior art, is illustrated in FIG. 2. The local control device 122 is a collection of devices that implement various functions at the controlled access point or generate data enabling the SAC 120 to effect decisions on-the basis of a programmed logic. The SAC 120 is typically mounted remotely from the controlled access control point while the collection of devices are mounted locally to the controlled access point. The function of the SAC 120 is to receive and process data from various sources and then make the appropriate decisions, such as unlocking the door, for example. Examples of the components forming the local control device 122 are a lock device (LCK) 210, a lock status sensor (LSS) 211, a door contact sensor (DC) 212, a request-to-exit device (REX) 213, a card reader device (CR) 214, a warning device (WD) 215, a manual pull-station (PS) 216, an intercom (IC) 217, and a video camera (VID) 218. Each service requires individual wiring over a length of approximately 500 feet between the SAC 120 and the components at the controlled access point. In this example, a total of 22 wires and 1 coax cable are required between each controlled access point and the SAC 120. For the operation of such a system, the users needing access to the premises are issued portable memory devices 230 to 238 (e.g. memory card or an integrated circuit card) used to store their respective user identification numbers. The user identification number is usually a 26 to 32-bit number. The decision making process is effected at the level of the SAC 120 that stores all the identification numbers, user information, schedules, door access information, etc. in its processor memory.

Figure 3:
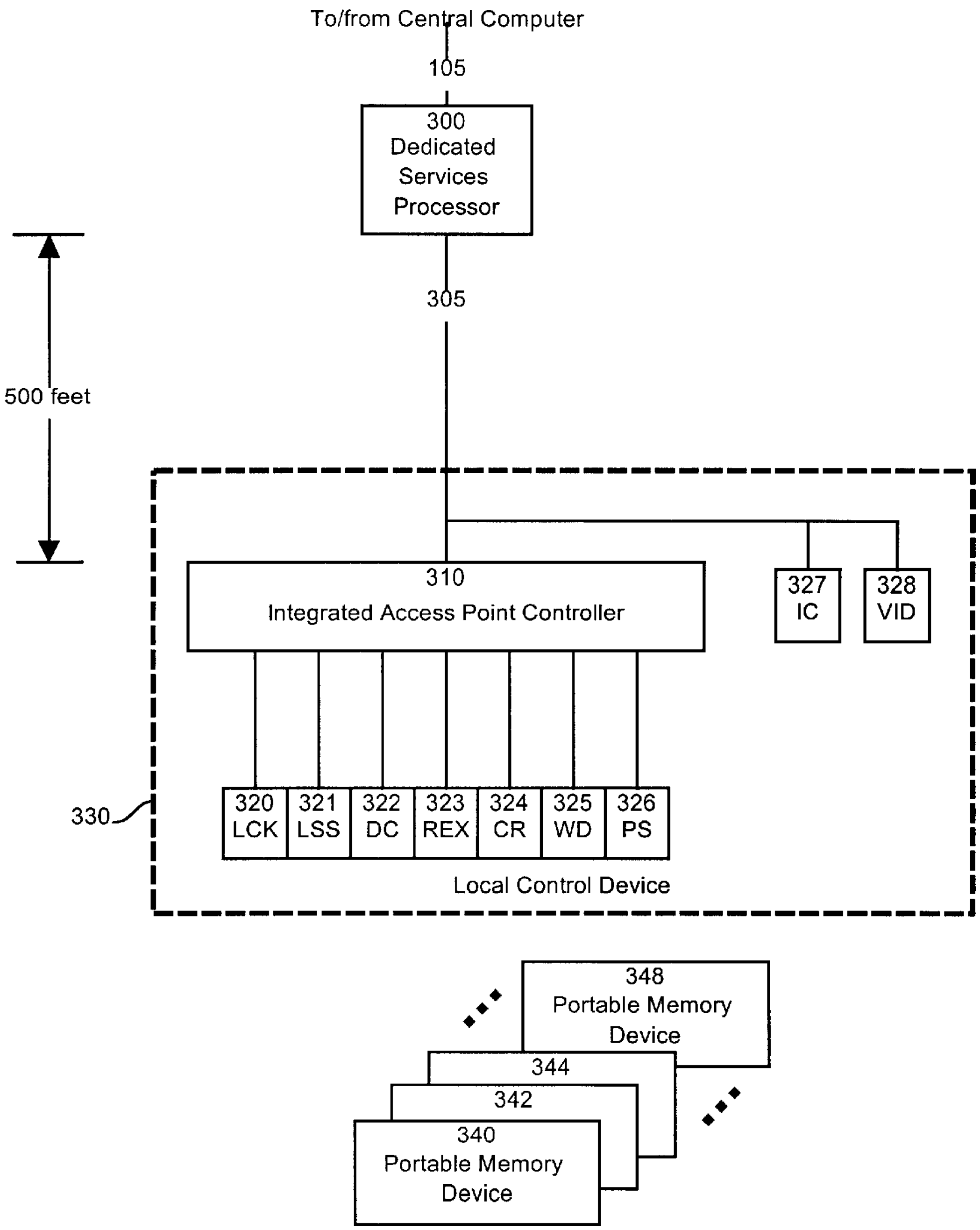
FIG. 3 is a block diagram of a local control device and of a Dedicated Services Processor of an access control system implementing the principles of the present invention.

The structure of a local control device and a Dedicated Services Processor., in accordance with the invention, that implements the functionality of an local control device/SAC combination is illustrated in FIG. 3. FIG. 3 shows a distributed structure that includes a Dedicated Services Processor (DSP) 300 that is located remotely from the controlled access point, an Integrated Access Point Controller (IAPC) 310 and a set of components 320–328 for data gathering and for implementing certain functions at the controlled access point. The IAPC 310 and the set of components 320–328 are mounted locally in the vicinity of the controlled access point and form the local control device 330. The DSP 300 is essentially a bridge device that provides power and data formatting and translation functions to the IAPC 310. It can be installed in a service cabinet located at an intermediate point between the IAPC 310 and a CACSC 100 such as in FIG. 1. The IAPC 310 can be connected to the DSP 300 by a twisted wire pair. The set of components 320–326 connected to the IAPC 310 include a lock device (LCK) 320, a lock status sensor (LSS) 321, a door contact sensor (DC) 322, a request-to-exit device (REX) 323, a card reader device (CR) 324, a warning device (WD) 325 and a manual pull-station (PS) 326. The intercom (IC) 327 and the video camera (VID) 328 are connected in directly to the twisted wire pair 305.

The operation of the IAPC requires the use of portable memory devices 340 to 348 issued to respective users that may hold for example 2K bits of data of schedule data, memory address indexing, user ID #, user photograph, etc. A portable memory device in the form of an access card that was used successfully is available from Card Intell, Inc. under the product number V4050. Details concerning the access cards are provided later with FIG. 5.

Figure 4:
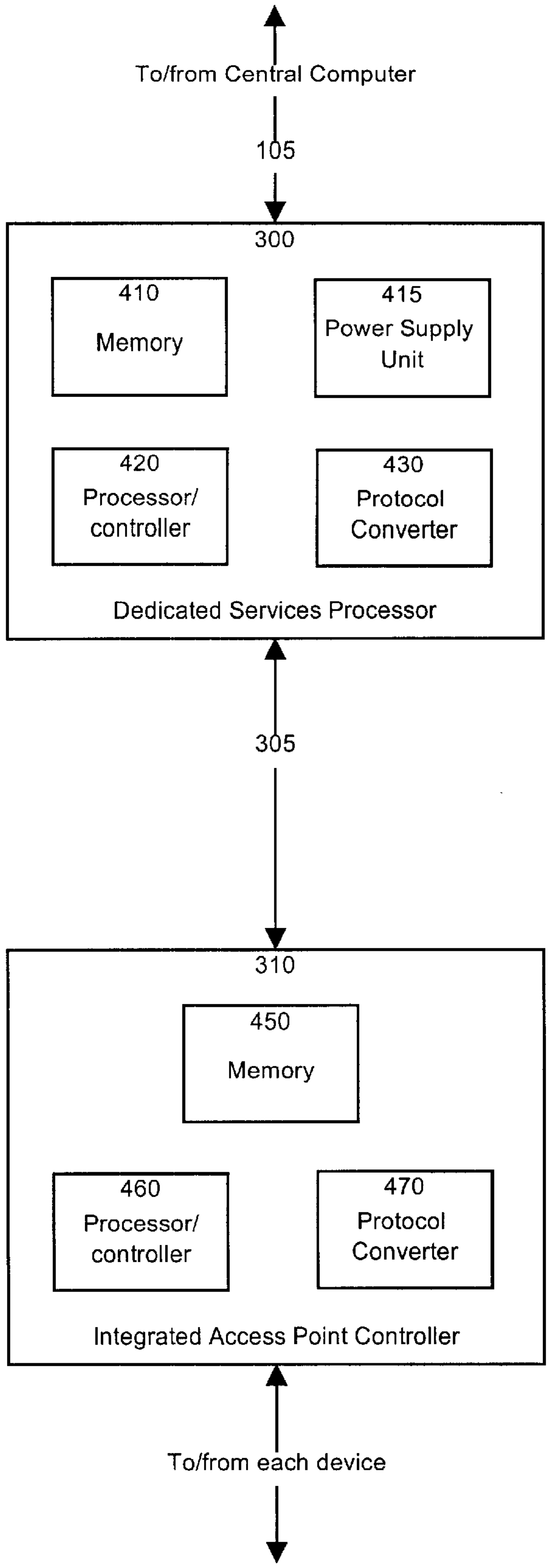
FIG. 4 is a block diagram detailing the structure of the components illustrated in FIG. 3.

The DSP 300 and the IAPC 310 from FIG. 3 are further detailed in FIG. 4. The basic components of an IAPC 310 are a memory 450, a processor/controller 460 and a protocol converter 470. The memory 450 holds, among other information, the instruction set for the processor/controller 460, schedule validation data for each user and a list of valid identification numbers for this controlled access point. The processor/controller 460 performs command and control functions for all the incoming, outgoing and internal data. The processor/controller 460 is implemented with an acceptance mask that screen unwanted messages. The protocol converter 470 converts data to/from the data communication protocol for each of the devices 320 to 326 to/from the data communication protocol on wire pair link 305. The protocol converter 470 can be implemented in software, however it is preferred to implement this component in hardware.

The basic components of a DSP 300 are a memory 410, a power supply unit 415, a processor/controller 420 and a protocol converter 430. The memory 410 holds, among other information, the instruction set for the processor/controller 420, and a transactions or events buffer. The power supply unit 415 is simply a battery used as a back-up power source. The processor/controller. 420 performs command and control functions for all the incoming, outgoing and internal data. The processor/controller 420 is implemented with an acceptance mask that screens unwanted messages. It also integrates a Dynamic Response System (DRS). The DRS is necessary in order to supply the correct amount of power to the IACP 310. Power is lost on link 305 due to wire resistance. For example, for a link 305 of 100 feet the DSP 300 may need to supply 16 volts in order to get 12 volts at the IACP 310. In another situation the link 305 may be of 500 feet and, in this case, the DSP may need to supply 24 volts in order to get the same 12 volts at the IACP 310. Therefore, in order to accommodate different link 305 lengths, the IACP 310 will measure the input voltage it receives and advise the processor/controller 420 to raise or lower its voltage. The protocol converter 430 converts data to/from the data communication protocol on link 105 to/from the data communication protocol on link 305.

Figure 5A:
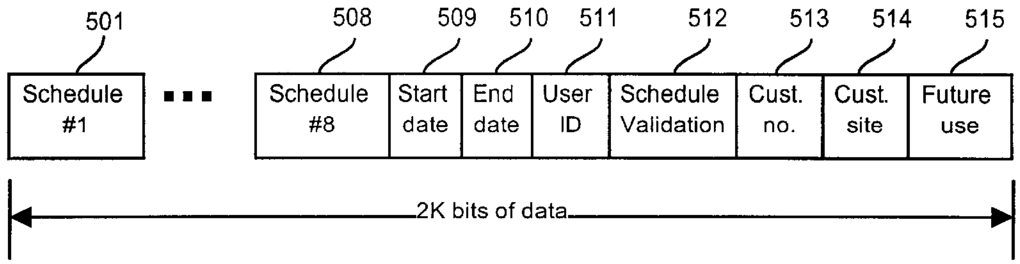
FIG. 5*a* illustrates the memory data structure for a portable memory device, such as a portable access card in accordance with the invention.

A memory allocation for the 2K bits of data on any one of the access cards 340 to 348 is shown in FIG. 5*a*. In a preferred embodiment, the memory contains a global set of schedule data elements, the set containing eight individual schedule data element fields 501 to 508. Each schedule data element defines a time interval. The time interval definition uses 4 bytes (32 bits) of data and it is made relative to a start date stored in the field 509, and an end date stored in a field 510. As such the start date and end date fields 509 and 510 do not form part of the global set of schedule data elements, however this is not critical to the success of the invention. It may very well be envisaged to integrate the start date and end date fields to the schedule data elements. The portable memory device also has a user identification field 511 to store a user identification number, a schedule validation data field 512, a customer number field 513 and a customer site field 514.

The remaining part 515 of the memory of each access card 340–348 may be used for things such as: a user profile that may indicate user preferences (i.e. heating, air conditioning, lighting, etc.) or privileges (i.e. arm or disarm); a photograph of the user; a door open delay per user, which may be necessary if some users require more time to access than others; and a Personal Identification Number (PIN), which is required if a code must be entered along with the card.

Figure 5B:
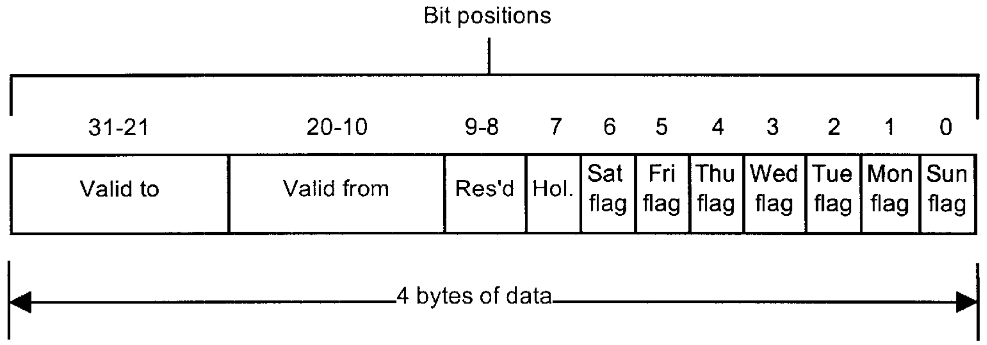
FIG. 5*b* illustrates the bit allocation of a schedule data element of the portable memory device whose data structure is depicted at FIG. 5*a;*

The stored schedule data elements 501 to 508 indicate the times at which the user may potentially be authorized to enter the premises at this location. An example of the bit allocation for one schedule data element is shown in FIG. 5*b*. The first 8 bits (bits 0 to 7) are flags that indicate the days of the week and holidays that are valid. Bits 8 and 9 are not used. Bits 10 to 20 indicate the beginning of the time interval while bits 21 to 31 indicate the end of the time interval with reference to a 24 hour time frame. In a specific example, the beginning of the time interval may be 09h00 while the end of the time interval may be 17h00. In this example, the time interval is the same for every day, however it may be envisaged to use different time intervals for different days of the week. This may be accomplished by using a more elaborate data structure to store the additional information. An example of a schedule is detailed in the table hereunder.

| BIT | VALUE | REPRESENTATION |
|---|---|---|
| 31–21 | 011 111 1100* | To 17h00 |
| 20–10 | 010 0001 110** | From 09h00 |

-continued

| BIT | VALUE | REPRESENTATION |
|---|---|---|
| 8–9 | 00 | — |
| 7–0 | 00111110*** | Friday, Thursday, Wednesday, Tuesday, Monday |

Notes:
*this is the number 3FC in hexadecimal form or 1020 in decimal, which is equal to 17 × 60 minutes since 00h00.
**this is the number 21C in hexadecimal form or 540 in decimal, which is equal to 9 × 60 minutes since 00h00.
***these are the flags for each day included in this from-to schedule (i.e. a “1” indicates that the corresponding day is valid).

In the example in the above table, the user is potentially authorized to enter the premises on every day of the week except Saturday and Sunday from 09h00 to 17h00.

Figure 5C:
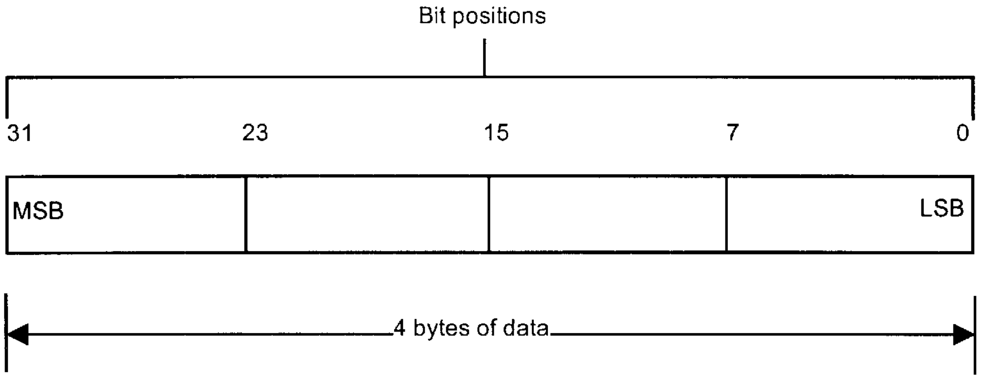
FIG. 5*c* provides a bit allocation for the user identification number of the portable memory device whose data structure is depicted at FIG. 5*a;*

The start 509 and end 510 dates are of the same format and in a preferred embodiment this format is a shown in FIG. 5*c*. This figure simply shows a 32 bit format where bit “0” is the Least Significant Bit (LSB) and bit 31 is the Most Significant Bit (MSB). In their hexadecimal form, the 4 bytes (32 bits) represent the count in seconds since Jan. 1, 1970. Therefore, a bit allocation such as “0011 0101 0000 1011 0001 1010 0000 0000” is 350B1A00 inhexadecimal or 889,920,000 in decimal, which represents Mar. 15, 1998 because, on that date, 889,574,400 seconds have past since Jan. 1, 1970. The data in the start date field 509 and the end date field 510 establish boundaries in the time domain to control when one can start using the card and when the card expires. This is simply a mechanism to avoid releasing, to a user, a card that can be perpetually used.

The start 509 and end 510 dates are of the same format and in a preferred embodiment this format is shown in FIG. 5*c*. This figure simply shows a 32 bit format where bit “0” is the Least Significant Bit (LSB) and bit 31 is the Most Significant Bit (MSB). In their hexadecimal form, the 4 bytes (32 bits) represent the count in seconds since Jan. 1, 1970. Therefore, a bit allocation such as “0011 0101 0000 1011 0001 1010 0000 0000” is 350B1A00 in hexadecimal or 889,920,000 in decimal, which represents Mar. 15, 1998 because, on that date, 889,574,400 seconds have past since Jan. 1, 1970. The data in the start date field 509 and the end data field 510 establish boundaries in the time domain to control when one can start using the card and when the card expires. This is simply a mechanism to avoid releasing, to a user, a card that can be perpetually used.

The memory 450 of the IAPC holds a table that is organized as follows:

| USER ID NUMBER | SCHEDULE VALIDATION FLAGS |
|---|---|
| 0001 0000 1110 0011 1111 0101 1001 1001 | 11111111 |
| 0001 0000 1110 0011 1111 0111 1001 0000 | 00110000 |
| 0001 1100 1110 0000 1111 0101 1001 0111 | 11110000 |
| 0001 0000 1111 0011 0000 1100 1001 0001 | 10000000 |

The validation flags are used to determine which ones of the individual schedule data elements stored on the access card are valid. The validation mechanism involves the data stored in the schedule validation field 512. For convenience, the data stored in this field is identical to the user identification number. Evidently, this is not a critical requirement and one may very well envisage to use a schedule validation data that is different from the user identification number. In use, the IAPC scans the user access card and loads in memory the data held in the memory of the access card. As a first step of the validation process, the IAPC compares the user identification number against a master list of user identification numbers established as a being valid. In a specific example this may involve simply searching the user ID number field in the above table to determine if the number read from the user access card is present. If the number is not found, the operation is terminated and no authorization to unlock the door is given. Otherwise, the IAPC proceeds to the next step that determines if the user can be granted access to the premises at the particular time the operation is being effected. Essentially, this is determined by processing the schedule data elements, the schedule validation data and the schedule validation flags. These three elements of confirmation establish the time intervals during which access to the premises can be granted. Next, the system compares the time intervals with respect to the system time to determine if the transaction that it is being correctly effected falls in any one of the authorized time intervals. In the affirmative, the transaction request is validated and the door is unlocked or more of generally, the desired action that is sought by the user is completed.

In a preferred embodiment, the table includes an information field mapped to the user identification number. This information field contains eight schedule validation flags, there being one flag associated with a given schedule data element on the access card. In fact, this number could be the same as for the user identification.

The data stored in the schedule validation flags field is an eight bit data unit, each bit of this data unit being associated with a. respective schedule data element stored on the access card. The state of each schedule validation flag in the data unit determines whether the associated schedule data element is valid for this user. For instance, the value "0" indicates that the associated schedule data element is not valid, while the value "1" indicates that the schedule data element is valid. The schedule validation process thus consists of extracting the schedule validation data from the memory of the user access card and using that information as an index in the table in the user ID number field. When the corresponding record is found, the data unit in the schedule validation flags field is extracted. The individual bits are then read and the schedule data elements associated with the bits whose value is "1" are marked or otherwise indicated as being valid ones. This operation amounts to defining from the global set of schedule data elements stored on the access card a sub-set of schedule data elements that are valid. In a specific example, the first row of the table provides a 32 bit user ID number and the associated schedule validation flags data unit is an eight bit group where all the bits are set to the value "1". This means that all the schedule data elements of the global set are valid. In other words, the sub-set of schedule data elements is identical to the global set of schedule data elements. In the second row of the table, only two of the eight bits are set to "1", thus, only the associated two schedule data elements will be valid for this user. In this specific example, the sub-set extracted from the global set of schedule elements has only two members.

One possible variation that may be considered is to omit the schedule validation data provided on an access card and use the user ID number for a dual purpose, namely as an identifier of the user and also as an index to the table to extract the correct schedule validation flags group. However, the approach described earlier is preferred because it provides a greater flexibility in that the system is not restricted to use identical user ID numbers and schedule validation data.

The 4 bytes for the customer number 513 and the 4 bytes for the customer site 514 are, again, in the format shown in FIG. 5*c*. This additional information ensures that a user cannot by chance have the same number as another user and enter another site in the same company or for that matter any site from another company.

As for the future use 515 memory allocation, it may include additional features of an automated access control system such as photo identification.

The communication protocol that was developed for the preferred embodiment of this invention and that is used on link 305 is similar to the CAN electrical protocol or any other non-destructive protocol. It is implemented as a half-duplex connection; that is, only one node on the network may send information and all are receiving it. As stated earlier the protocol is used for power and data communication and uses a single twisted wire pair. One wire is common while the other's voltage level varies to represent different information. Two possible embodiments for this data communication protocol are described below. Both embodiments can accommodate up to seven nodes on the network, but could be easily expanded.

Figure 6A:
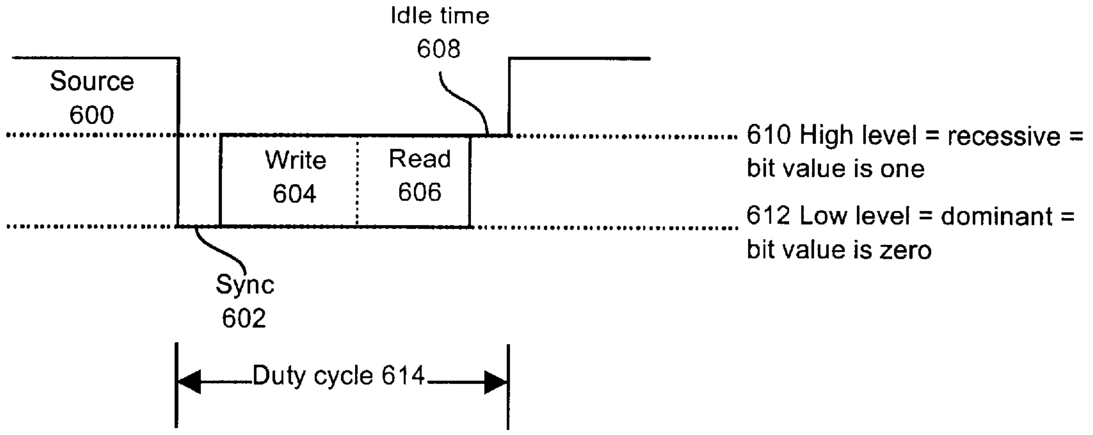
FIG. 6*a* illustrates a first embodiment of the data communication protocol on the link between a Dedicated Services Processor (DSP) and the components of the Local control device in accordance with the present invention.

FIG. 6*a* illustrates a first embodiment of the data communication protocol. Three voltage level are possible: the high level 610 that represents a one, which is recessive, a low level 612 that represents a zero, which is dominant, and finally the power source level 600 provides power to all network nodes. Also note that the low level 612 is used at the beginning of each data communication to synchronize the nodes. The Sync 602 uses 20% of the duty cycle 614. In an embodiment of the invention, a duty cycle of 100 microseconds was used successfully. Recessive 610 and dominant 612 bits need to be defined in order to determine priority in case of message collision. A bitwise arbitration approach is used to determine which message has priority. That is, if a node reads a dominant bit while it is transmitting a recessive bit, it will stop transmitting immediately and release the bus. The result is that the higher priority message is not lost. Before transmitting, a node must therefore monitor the network to verify if it is idle and wait for a Sync 602. The network is in an idle state after a 2-bit duty cycle 614 at the power source level 600.

Actual node data is being transmitted on the network during the Write 604 or Read 606 portions of the duty cycle. The Write 604 portion represents 40% of the duty cycle while the Read 606 portion represents 30% of the duty cycle. The remaining 10% of the duty cycle are reserved idle time 608 necessary for the release of the network back to the source level 600. In order to ensure release of the network the idle time is always at the recessive level 610 (i.e. a "one").

This example of the communication protocol is able to communicate one bit of data at a time. In use it may represent a value being written on the bus by a node (write 604) or a value that was read from the bus by a node (read 606). A few examples for bit transmissions follow. A node brings the voltage on the bus to zero 612. All nodes synchronize their clock by reading the falling signal. If the signal rises to one 610 at the beginning of the write portion 604, this node is writing a one on the bus. All nodes will read the rising edge of the signal. If the signal rises to one 610 at the end of the write portion 604, this node is writing a zero on the bus. If the signal rises to one 610 at the beginning of the read portion 606, this node is indicating that it read a one on the bus. Finally, if the signal rises to one 610 at the end of read portion 606, this node is indicating that it read a zero on the bus.

Figure 6B:
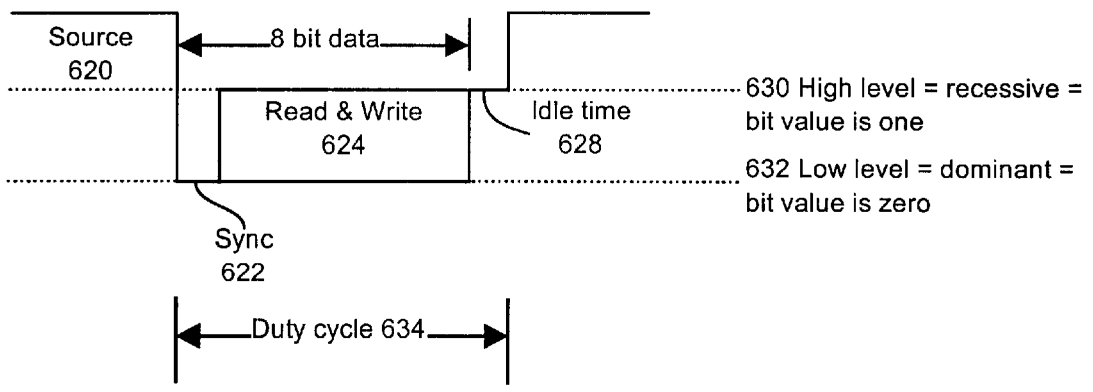
FIG. 6*b* illustrates a second embodiment of the data communication protocol on the link between the DSP and the components of the Local control device in accordance with the present invention.

FIG. 6*b* illustrates a second embodiment of the data communication protocol. In this embodiment, arbitration, bit values 630 and 632, power source 620, sync 602, idle time 628 and duty cycle 634 are all the same. The only difference resides in the data transmission. In this case, a value represented by 8 bits of data is transferred during 0% to 90% of the duty cycle 634 and this value is either being written on the bus or an indication of a value read from the bus.

In this example of the data communication protocol, the node clock rate is quite important. Eight bits of data can represent 256 different values. Good results for reading the bus falling or rising edge can be obtained by sampling twice for each of the 256 values. This means that during the 90 microseconds that the 8-bit data is represented (90% of 100 microseconds), the bus is read 512 times or at a rate of approximately 5.7 megahertz. Therefore, if, for example, a node brings the voltage on the bus to zero 632, all nodes will synchronize their clock by reading the falling signal. Then, if the signal rises to one 630, at 78.125% of the 90 microseconds 8-bit data period, this means that a node is writing (or showing that it read) 200 in decimal (78.125% of 256) or “1100 1000” in 8-bit binary format.

Considering that 20% of the duty cycle 634 is reserved for sync 622 and that the sync is part of the 8-bit data period, then the two least significant bits are sacrificed.

The above description of a preferred embodiment of the present invention should not be read in a limitative manner as refinements and variations are possible without departing from the spirit of the invention. The scope of the invention is defined in the appended claims and their equivalents.

We claim:

1. A portable memory device to enable execution of a desired action by a control device, said portable memory device comprising:

a) a machine readable storage medium holding a data structure including:

i) schedule data providing at least one time interval during which the execution of the desired action may potentially be authorized by the control device; and ii) schedule validation data. operative to validate said schedule data to the control device; and b) said data structure being readable by the control device to acquire said schedule data and schedule validation data for determining if the execution of the desired action is to be authorized on a basis at least in part of said schedule data and said schedule validation data.

2. A portable memory device as defined in claim 1, wherein said schedule data includes a global set of schedule data elements, each schedule data element being indicative of a different time interval during which execution of the desired action may be authorized by the control device.

3. A portable memory device as defined in claim 2, wherein said schedule validation data includes a schedule validation data element indicative through reference to a data arrangement external to said portable memory device of at least one of said schedule data elements that is representative of a time interval during which the control device authorizes execution of the desired action.

4. A portable memory device as defined in claim 3, wherein the control device controls access to a door.

5. A portable memory device as defined in claim 4, wherein said machine readable storage medium includes a user identification number.

6. A portable memory device as defined in claim 5, wherein said schedule validation data element is identical to said user identification number.

7. A portable memory device as defined in claim 6, wherein said portable memory device is shaped as a hand held card.

8. A portable access card for unlocking a door controlled by a control device, said portable access card comprising:

a) a machine readable storage medium holding a data structure including:

i) a global set of schedule data elements, each schedule data element of said set being indicative of a time interval during which the door may be potentially unlocked by the control device; and ii) schedule validation data; and b) said data structure being readable by the control device to acquire said schedule data elements and said schedule validation data, said schedule validation data being operative to validate at least one of said schedule data elements to the control device by indicating through reference to a data arrangement external to said portable access card the at least one schedule data element that is representative of a time interval during which the control device can unlock the door.

9. A portable access card as defined in claim 8, wherein said machine readable storage medium includes a user identification number.

10. A portable access card as defined in claim 9, wherein said schedule validation data is identical to said user identification number.

11. A control device for controlling the execution of a certain action, said control device including:

a) an input for receiving:

i) a global set of schedule data elements, each schedule data element of said set being indicative of a time interval during which the execution of the certain action may potentially be authorized by the control device; and ii) schedule validation data; and b) a processing unit responsive to said schedule validation data to validate at least one of said schedule data elements by identifying in said set of schedule data elements the at least one schedule data element that is representative of a time interval during which the control device authorizes execution of the certain action.

12. A control device as defined in claim 11, wherein the certain action is unlocking a door.

13. A control device as defined in claim 12, wherein said control device includes a card reader through which said global set of schedule data elements and said schedule validation data can be acquired.

14. A control device as defined in claim 13, wherein said control device includes a machine readable storage medium holding a data structure mapping schedule validation data elements susceptible to be input through said card reader with authentication data, the authentication data for a given schedule validation data element identifying a sub-set of the global set of schedule data elements input through said card reader along with the given schedule validation data element, the sub-set of schedule data elements being indicative of respective time intervals during which a user is granted permission to access the door.

15. A control device as defined in claim 14, wherein a schedule data element belonging to a given set outside the sub-set identified by the authentication data associated with the given set is indicative of a time interval during which the user is denied permission to access the door.

16. A control device as defined in claim 15, wherein said processing unit is responsive to the input of a global set of schedule data elements and a corresponding schedule validation data element to search said machine readable storage medium to extract the authentication data associated with the schedule validation data element.

17. A control device as defined in claim 16, wherein said schedule validation data element constitutes an index of a table mapping schedule validation data elements susceptible to be input through said card reader with authentication data.

18. A control device as defined in claim 17, wherein said control device includes an output for generating a signal indicative to an electric lock to unlock the door.

19. A control device as defined in claim 18, wherein said processing unit enables generation of said signal indicative to an electric lock to unlock the door when a system time determined by said processing unit falls in the time interval defined by a schedule data element in a sub-set of schedule data elements identified by the authentication data.

* * * * *